(12) United States Patent
Mackenzie

(10) Patent No.: US 7,559,484 B2
(45) Date of Patent: Jul. 14, 2009

(54) PRODUCTS WITH DATA ENCODING PATTERN

(75) Inventor: Andrew Mackenzie, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 551 days.

(21) Appl. No.: 11/187,234

(22) Filed: Jul. 22, 2005

(65) Prior Publication Data
US 2006/0022061 A1 Feb. 2, 2006

(30) Foreign Application Priority Data
Jul. 29, 2004 (GB) ................. 0416863.9

(51) Int. Cl.
G06K 19/06 (2006.01)

(52) U.S. Cl. ..................... 235/494; 235/487

(58) Field of Classification Search .......... 235/494, 235/487, 462.01
See application file for complete search history.

(56) References Cited

U.S. PATENT DOCUMENTS

| 6,360,948 | B1 | 3/2002 | Yang et al. |
| 7,014,123 | B2 * | 3/2006 | Lapstun ............ 235/494 |

FOREIGN PATENT DOCUMENTS

CA 2376766 12/2000

* cited by examiner

Primary Examiner—Karl D. Frech

(57) ABSTRACT

A product 2 has a data encoding pattern 6 thereon. The pattern comprising a plurality of pattern cells 200 each of which has a pattern selected from a group of cell patterns. Each cell pattern comprises a plurality of cell elements 204 each of which can have any of a plurality of marking states, such that the marking states of the elements produce the cell pattern. Each cell pattern has at least two lines of symmetry. At least some of the cells are arranged in a manner which is dependent on the position of the content 20 Claims, 9 Drawing Sheets

Fig 2
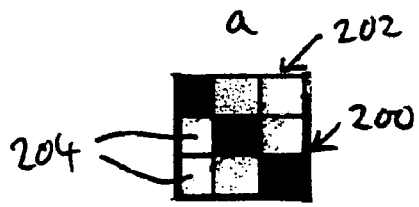
a
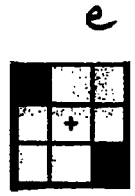
e
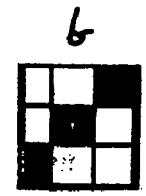
b
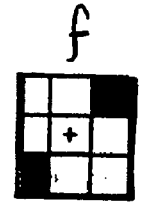
f
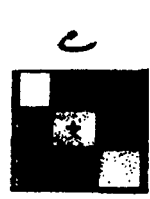
c
g
d
h
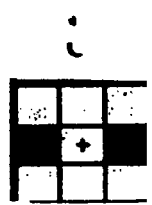
i
m
j
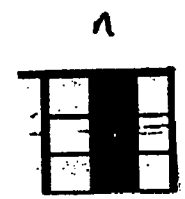
n
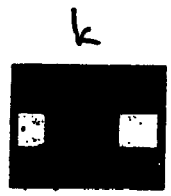
k
o
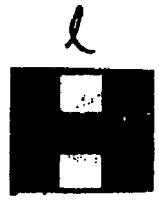
l
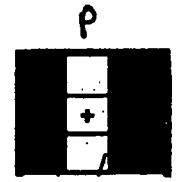
p
q
s
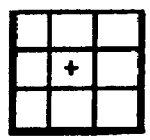
r
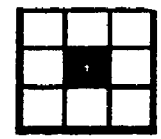
t
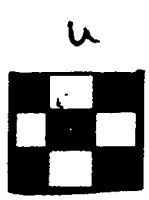
u
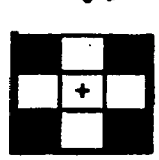
w
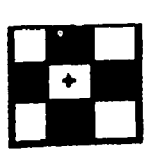
v
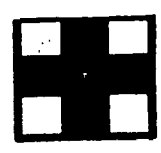
x

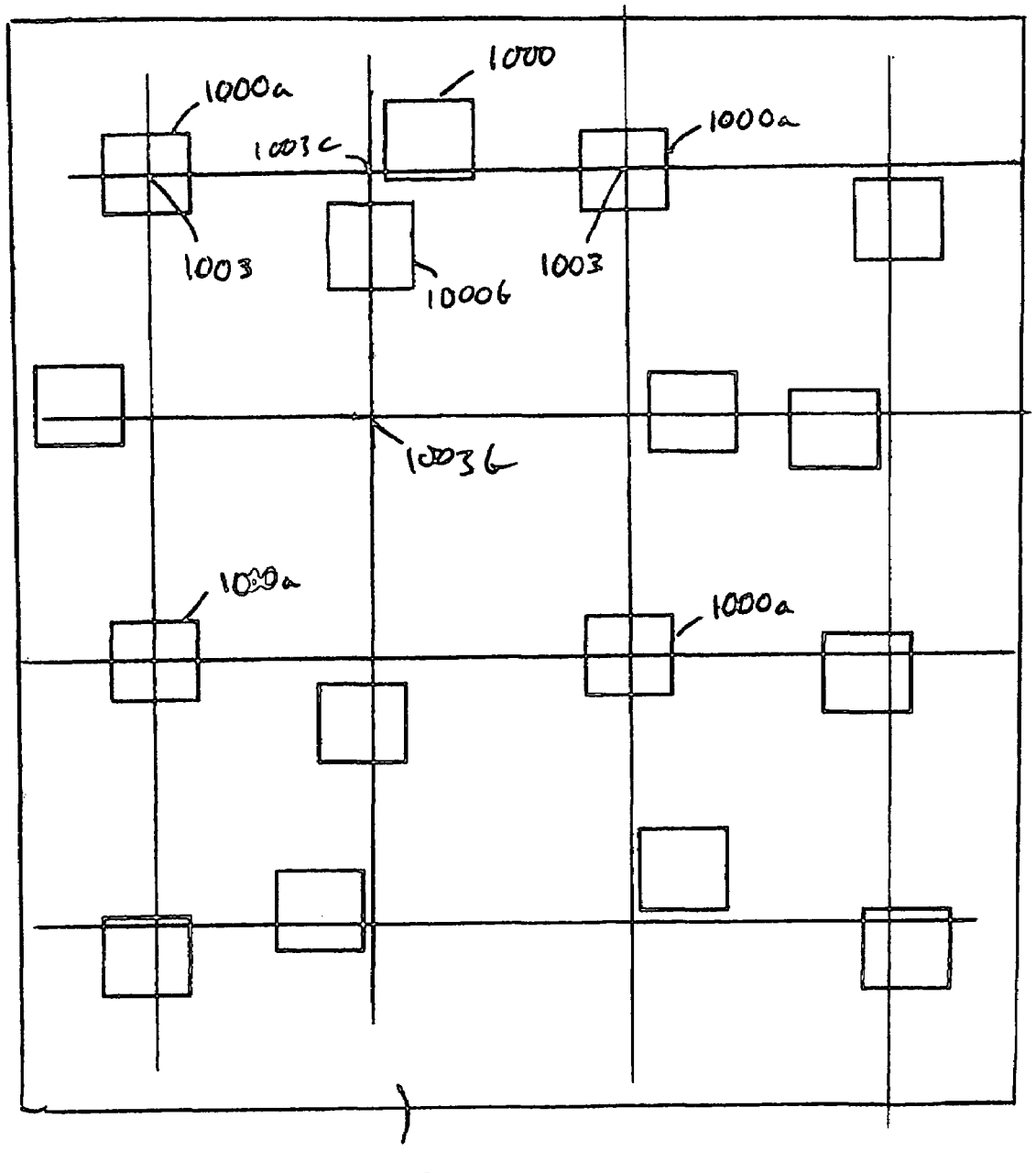

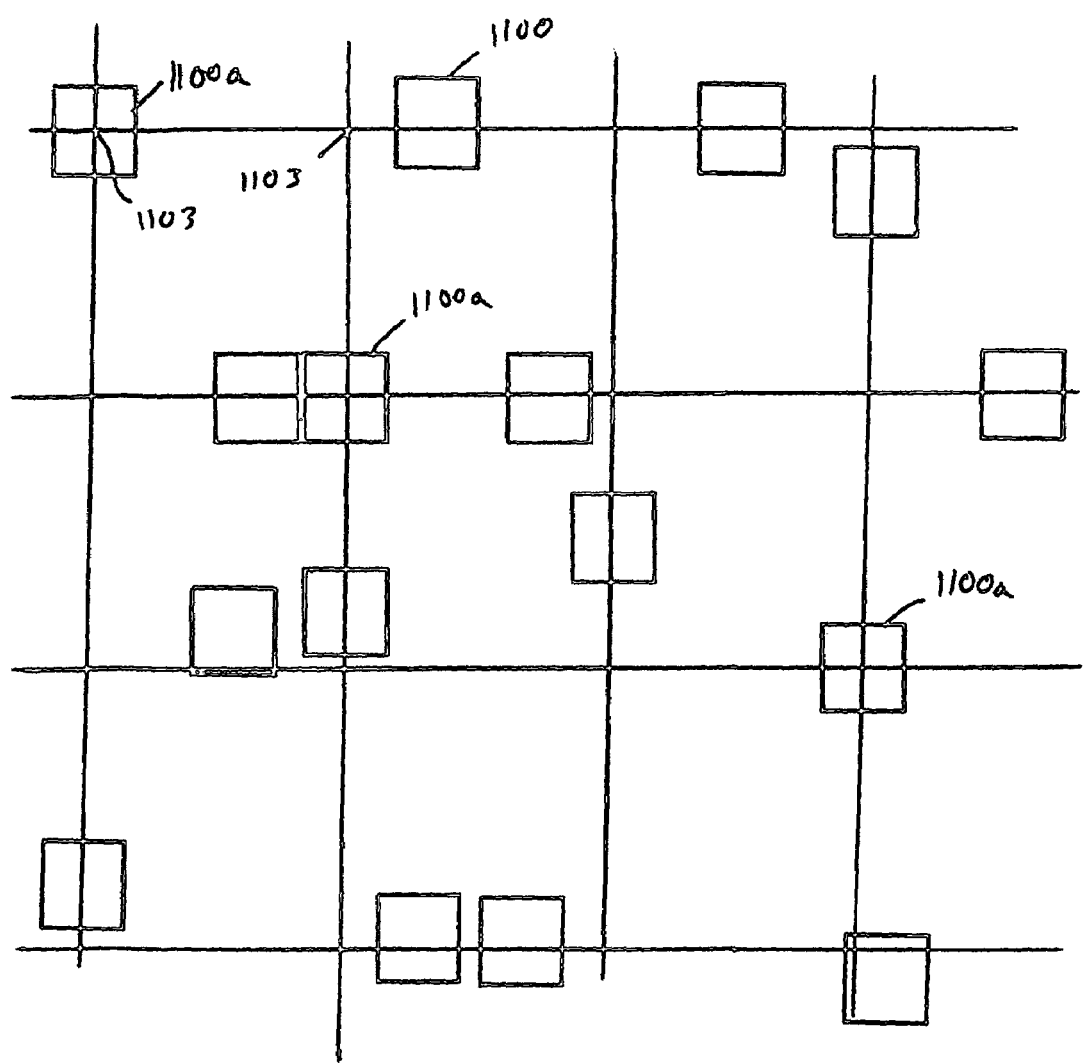

PRODUCTS WITH DATA ENCODING PATTERN

FIELD OF THE INVENTION

The present invention relates to products having data encoding pattern on them.

BACKGROUND TO THE INVENTION

It is known to provide data encoding pattern on products, for example documents, so that a hand held device, such as a pen, can read the data encoded in the pattern and use it, for example, to detect its position as it is moved over the document. Where the hand held device is a pen arranged to mark the product, the position of marks made on the documents can be detected by the pen, thereby enabling the position of the marks on the document to be stored electronically as they are made.

SUMMARY OF THE INVENTION

The present invention provides a product having a data encoding pattern thereon, the pattern comprising a plurality of pattern cells each of which has a pattern selected from a group of cell patterns, wherein each cell pattern comprises a plurality of cell elements, each of which can have any of a plurality of marking states, such that the marking states of the elements produce the cell pattern, each cell pattern having at least two lines of symmetry.

The lines of symmetry may be intersecting lines of symmetry, and may intersect at a point within the pattern cell. This enables the position of the intersection to be easily detected. The lines may intersect at right angles, for example in a square cell, or at other angles, such as 60° in a hexagonal cell.

This makes reading of the pattern relatively simple, as the centre point of each cell can be easily identified, and therefore the pattern of each cell and its position can be identified in a robust manner.

The present invention further provides a method of generating a data encoding pattern for application to a product, the method comprising the steps of:
  defining a plurality of pattern cells each of which has a pattern selected from a group of cell patterns, wherein each cell pattern comprises a plurality of cell elements each of which can have any of a plurality of marking states, such that the marking states of the elements produce the cell pattern, each cell pattern having at least two lines of symmetry; and
  defining a position for each of the cells.

The present invention further provides a method of reading data from a pattern on a product comprising:
  imaging an area of the product;
  identifying within the imaged area a plurality of pattern cells each comprising a plurality of cell elements each of which has one of a plurality of marking states, such that the marking states of the elements of each cell produce a cell pattern having at least two lines of symmetry; and
  identifying data associated with the cell patterns.

The present invention further provides a method of generating an image comprising a content component and a data encoding component, wherein the data encoding component comprises a plurality of cells each of which has one of a group of cell patterns, the method comprising:
  determining the cell patterns of a plurality of cells; and
  locating the cells at positions dependent on the content component.

This can allow significant freedom in the placing of at least parts of the pattern on the product, which in turn can allow, for example, overlap of the content and the individual pattern cells to be reduced.

The present invention still further provides a product having a data encoding pattern thereon, the pattern being formed from a plurality of glyphs each having a visible structure made up of a number of optically identifiable elements, the pattern encoding data that can be determined from glyphs, wherein each glyph has at least two lines of symmetry. Corresponding methods and systems for generating and reading patterns are also provided.

Corresponding data carriers and systems are also provided. The data carrier can comprise a floppy disk, a CDROM, a DVD ROM/RAM (including +RW, -RW), a hard drive, a non-volatile memory, any form of magneto optical disk, a wire, a transmitted signal (which may comprise an internet download, an ftp transfer, or the like), or any other form of computer readable medium.

Preferred embodiments of the present invention will now be described by way of example only with reference to the accompanying drawings.

BRIEF DESCRIPTION OF THE DRAWINGS

FIG. 2 shows a group of cell patterns used to encode data on the document of FIG. 1;

FIG. 10 shows an enlarged portion of a document according to a further embodiment of the invention having data encoding pattern on it; and FIG. 11 shows an enlarged portion of a document according to a still further embodiment of the invention having data encoding pattern on it.

DESCRIPTION OF THE PREFERRED EMBODIMENTS

Figure 1:
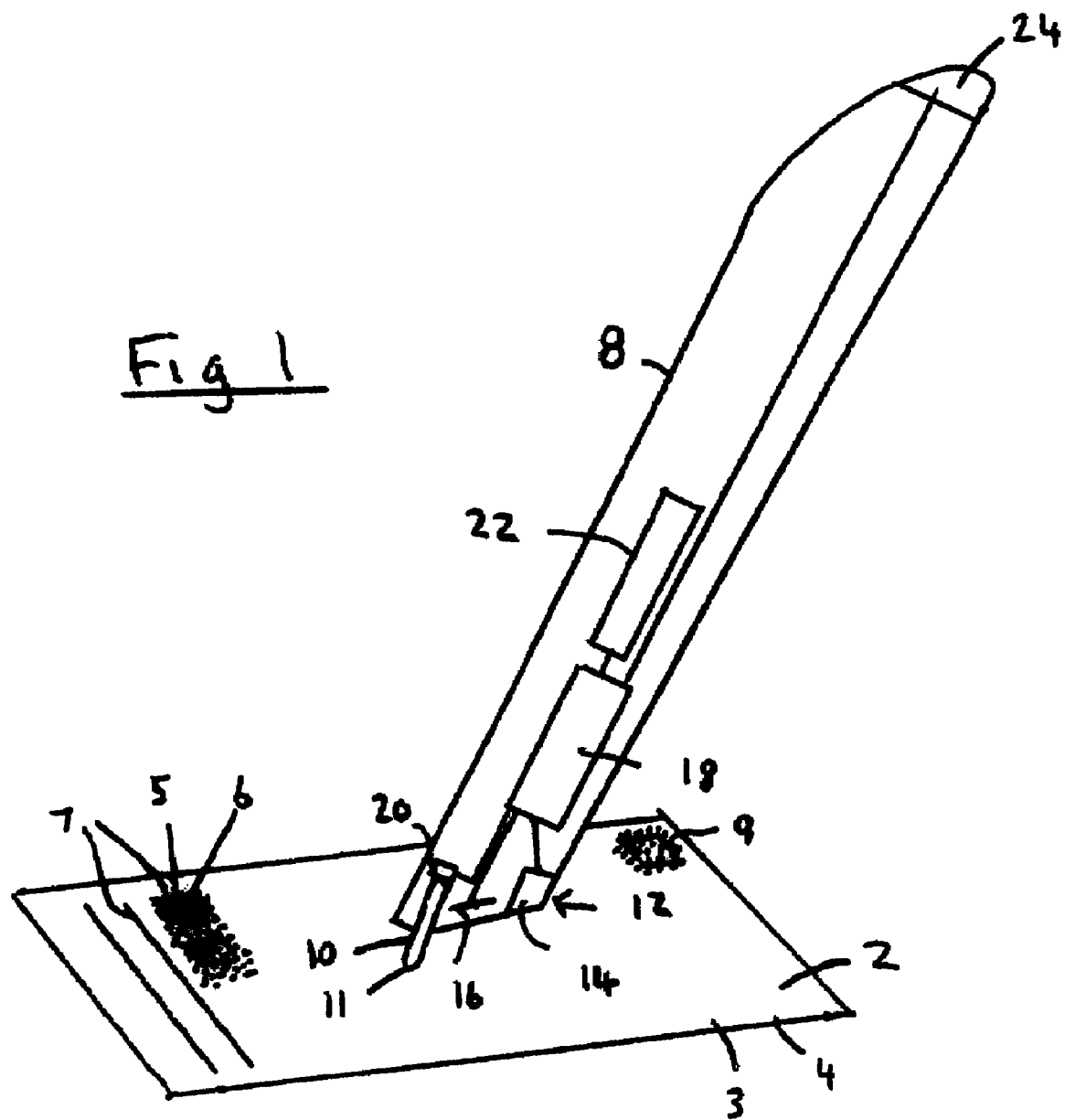
FIG. 1 shows schematically a document according to an embodiment of the invention and a pen for use with the document.

Referring to FIG. 1, a document 2 according to the invention for use in a digital pen and paper system comprises a carrier 3 in the form of a single sheet of paper 4 with position identifying markings 5 printed on some parts of it. The markings 5, which are not shown to scale in FIG. 1, form a position identifying pattern 6 on the document 2. Also printed on the paper 4 are further markings 7 which are clearly visible to a human user of the document, and which make up the human visible content of the document 2. The content 7 is in the form of a number of lines and text and graphic features which extend over, and are therefore superimposed upon, the pattern 6.

The pen 8 comprises a writing nib 10, and a camera 12 made up of an infra red (IR) LED 14 and a CMOS sensor 16. The camera 12 is arranged to image a circular area adjacent to the tip 11 of the pen nib 10. A processor 18 processes images from the camera 12 taken at a predetermined rapid sample rate. A pressure sensor 20 detects when the nib 10 is in contact with the document 2 and triggers operation of the camera 12. Whenever the pen is being used on an area of the document 2 having the pattern 6 on it, the processor 18 can determine from the pattern 6 the position of the nib 10 of the pen whenever it is in contact with the document 2. From this it can determine the position and shape of any marks made on the patterned areas of the document 2. This information is stored in a memory 22 in the pen as it is being used. When the user has finished marking the document 2, this is recorded in a document completion process, for example by making a mark with the pen 8 in a send box 9. The pen is arranged to recognise the pattern in the send box 9 and send the pen stoke data to a pen stroke interpretation system in a suitable manner, for example via a radio transceiver 24 which provides a Bluetooth radio link with an internet connected PC. Suitable pens are available from Logitech under the trade mark Logitech Io, and from Nokia.

Referring to FIG. 2, the markings 5 are made up of cells or glyphs 200 each which is made up of a regular square array 202 of nine square optically identifiable pattern elements 204. Each element 204 can be either marked, having black ink applied to it, or unmarked, being left blank, which in this case is shown as white. The combination of marked elements 204 in each cell 200 makes up a cell pattern. Only cell patterns that have 180 degree rotational symmetry are used in the pattern, and these are shown in FIG. 2. These include patterns a and b each of which has a diagonal row of three black elements and six white elements, and patterns c and d, which are the inverse of patterns a and b, each having a diagonal row of three white elements and six black elements. Paterns e and f have two black elements at diagonally opposite corners of the cell, and seven white elements, and patterns g and h are the inverse of these. Patterns i and j have two black elements each in the centre of an opposite side of the square, and patterns k and l are the inverse of these. Patterns m and n have a line of three black squares in the central horizontal and vertical lines respectively, and patterns o and p are the inverse of these. Pattern q is all black and pattern r is all white. Pattern s is black with the one central square white, and pattern t is the inverse of this. Pattern u has four white squares, one in the middle of each side of the square, and pattern v is the inverse of this. Pattern w has a black square in each corner of the square, and pattern x is the inverse of this.

It will be noted that each of these patterns has at least two intersecting lines of symmetry, which in this case are mutually orthogonal. In patterns a, b, c, d, e, f, g and h these are the diagonal lines of the square. In patterns i, j, k, l, m, n, o, and p, they are the lines through the centre of the square parallel to its sides. For patterns p, q, r, s, t, u, v and w there are four lines of symmetry, both on the diagonals of the square and parallel to the sides. In this example, patterns q, r, s and t are not used as they could be confused with solid black content, a blank space, or grey scale content. Therefore there are 20 different cell patterns used, and each one can therefore code four bits of data.

Figure 3:
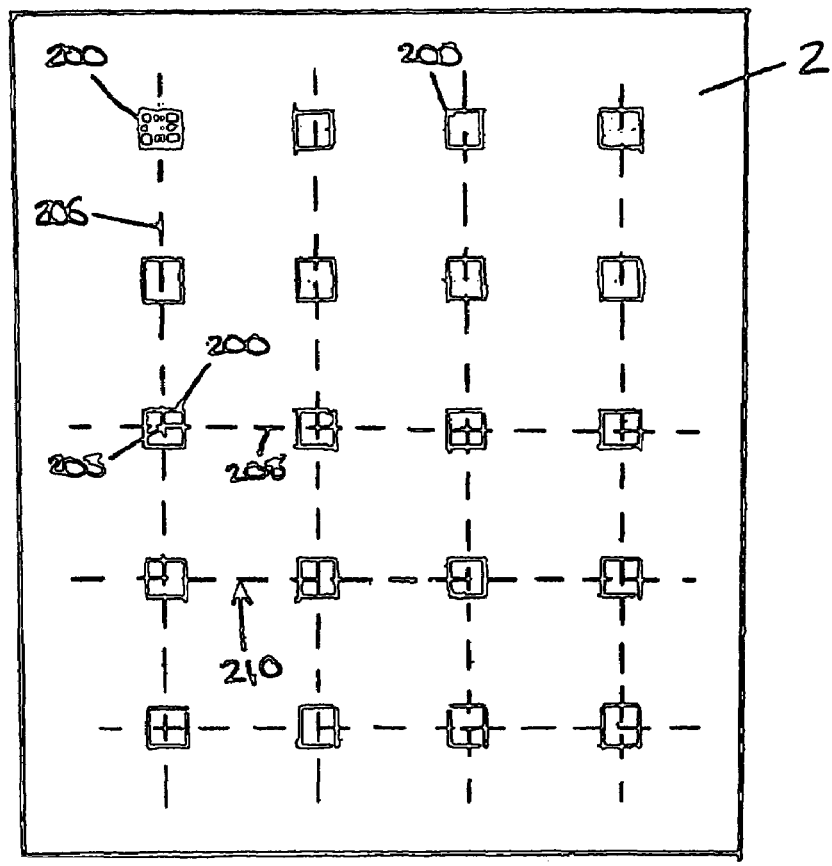
FIG. 3 shows an enlarged portion of a data encoding pattern on the document of FIG. 1.

Referring to FIG. 3, the cells 200 are spaced apart on the document 2 in a regular square array. The centre of each cell 200 can be considered as being on the intersection of the vertical 206 and horizontal 208 lines of a regular square grid 210. This grid is not marked on the document, but is used by the system that reads the pattern as will be described in more detail below.

Figure 4:
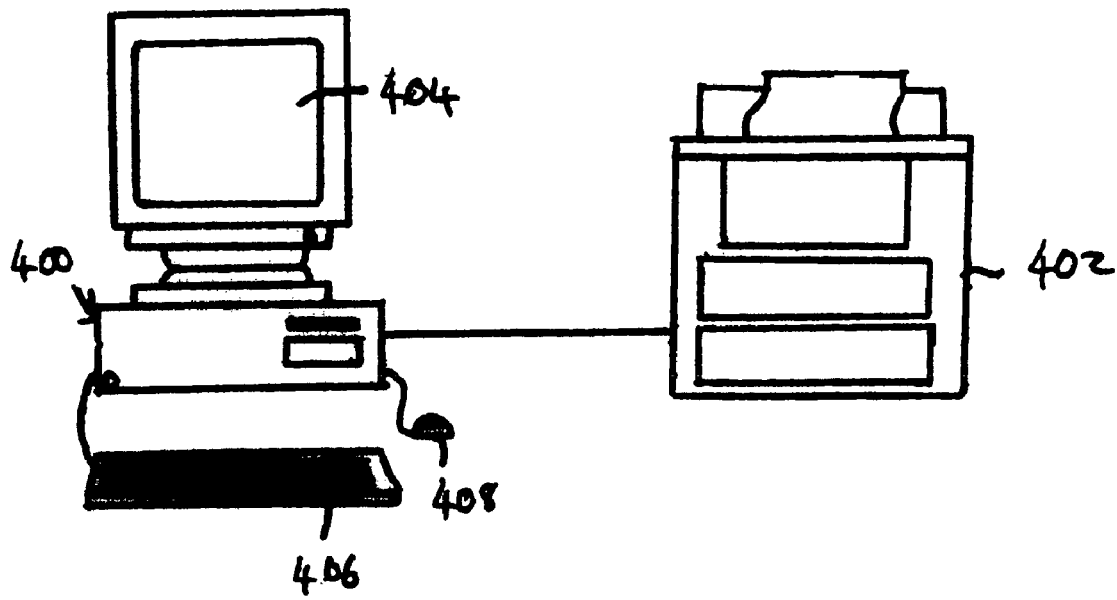
FIG. 4 is a schematic diagram of a system for producing the document of FIG. 1.
Figure 5:
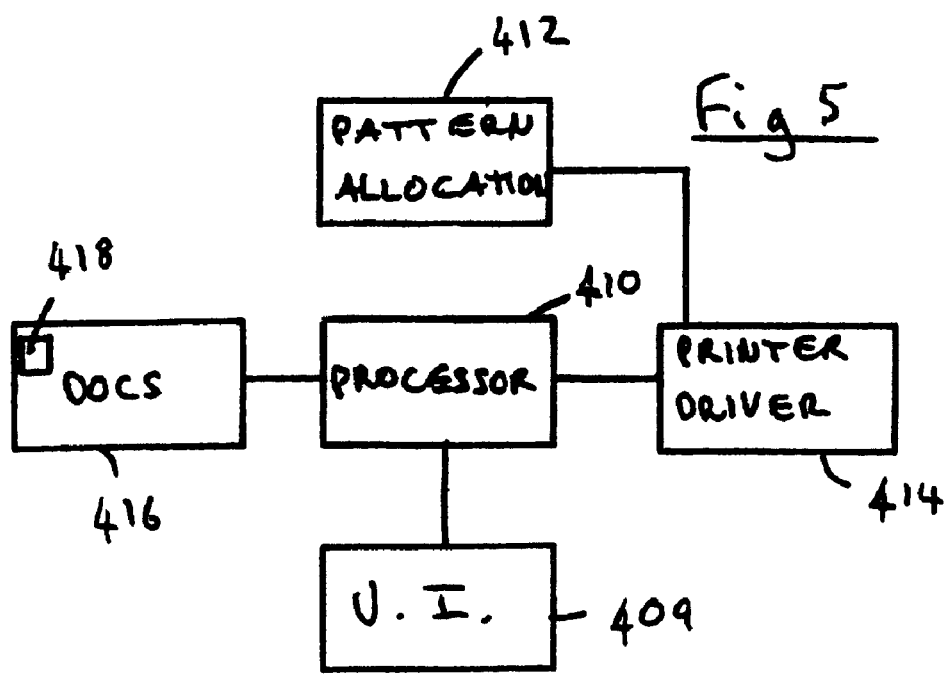
FIG. 5 is a diagram of the functional bocks of the system of FIG. 4.

Referring to FIGS. 4 and 5, a very simple system for producing printed documents having the position identifying pattern on them comprises a personal computer (PC) 400 and a printer 402. The PC 400 has a screen 404, a keyboard 406 and a mouse 408 connected to it to provide a user interface 409 as shown generally in FIG. 11. As also shown in FIG. 11, the PC 400 comprises a processor 410 and a pattern allocation module 412 which is a software module stored in memory. The pattern allocation module 412 includes a definition of a total area of pattern space and a record of which parts of that total area have been allocated to specific documents, for example by means of coordinate references. The PC 400 further comprises a printer driver 414, which is a further software module, and a memory 416 having electronic documents 418 stored in it. The user interface 409 allows a user to interact with the PC 400.

The printer 402 can be any printer which has sufficient resolution to print the pattern 6 and the content 7. In this case it is a 600 dots per inch (dpi) monochrome laser jet printer. The elements 204 of the cells are each arranged to be equal in size to the nominal size of a 2×2 square of four printer dots, so that the pattern can be printed consistently by the printer 402. Each element is therefore about 83 µm across.

Figure 6:
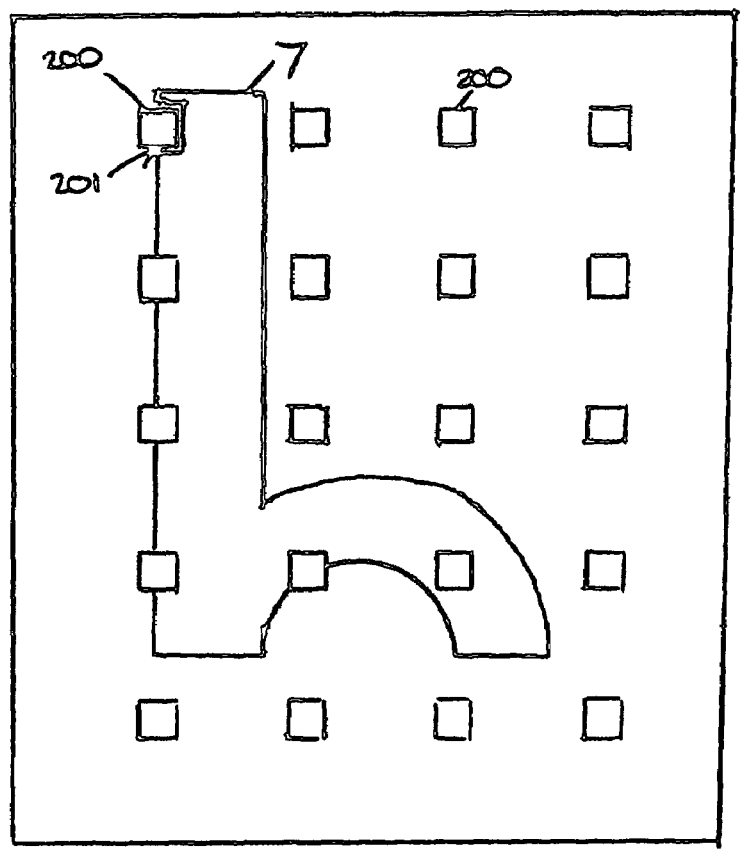
FIG. 6 shows an enlarged portion of the pattern on the document of FIG. 1 where it overlaps with content on the document.

Referring to FIG. 6, where the content 7 overlaps with the pattern cells 200, the cells 200 are printed in full and the content is only printed in the gaps between the pattern cells 200. A margin 201 is left around each pattern cell 200 in which there is no content and no pattern printed. This ensures that the pattern cells can be distinguished from, and do not merge with, the content. In FIG. 6 the size of the cells 200, which is about 250 µm, relative to the content 7, is exaggerated, and their spacing which is at 1 mm intervals, with 750 µm gaps between adjacent cells 200, is also not shown to scale. In practice, for all content features that are normally easily visible to the human eye, the pattern cells 200 will not obscure a significant portion of the content, and the content will therefore remain easily identifiable to the human eye. In this embodiment only one colour of ink is used for the pattern and content, printed with a monochrome printer. It is therefore necessary to separate the pattern and the content as described above to be able to distinguish them. If the pattern and content are printed using different coloured inks, or inks with different optical properties at one wavelength that can be detected by a system reading the pattern, then this is not necessary.

Figure 7:
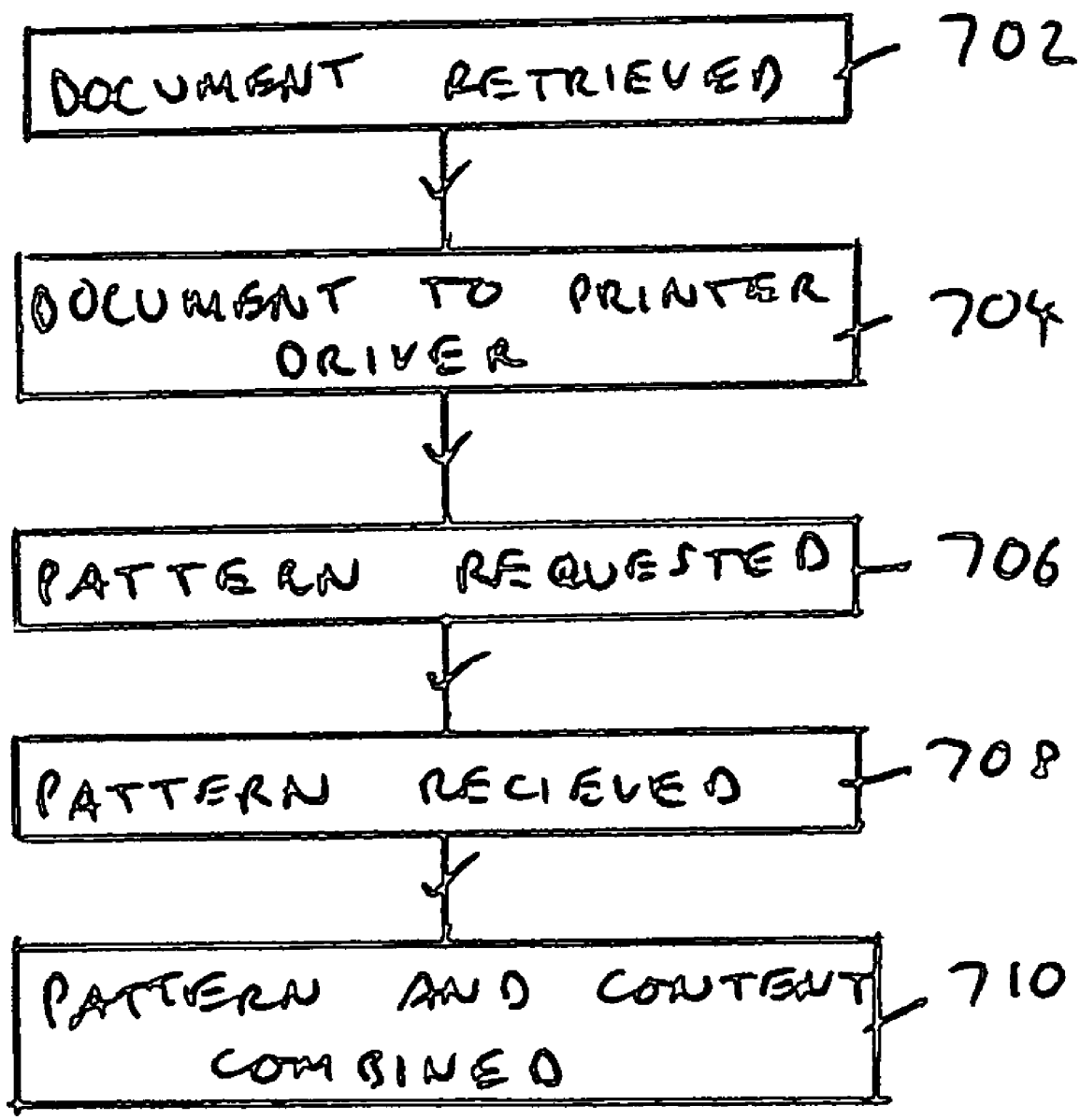
FIG. 7 is a flow diagram illustrating a method according to an embodiment of the invention of producing the document of FIG. 1.

Referring to FIG. 7 in order to produce the printed document 2 the processor 410 retrieves an electronic document 418, which may be in the form of a PDF file, from the memory 416 at step 702 and sends it to the printer driver at step 704. The electronic document 418 contains a definition of the content 7, and the areas of the document 2 which are to have the pattern 6 printed on it. At step 706 the printer driver 414 requests the required amount of pattern from the pattern allocation module 412 which allocates by means of coordinate references an area of the pattern space to the document, generates the pattern 6 for that area using a pattern generation algorithm, and communicates the details of the pattern including the positions of all the required cells and the pattern each is to contain, back to the printer driver 214, which receives it at step 708. The printer driver 414 then combines the content 7 and the pattern 6 into a single file at step 710, which is typically a post script file or a PCL file, but may be a modified PDF file. This file can then be printed onto paper to produce the document.

Once the document has been printed, the pen 8 can be used to mark the document and to store electronically details of all marks made. This enables processing of the marks made on the document. As the pen 8 is moved over the document 2, the camera 12 stores an image of an area of 3 mm square of the document at regular intervals. The imaged area will therefore always include at least one group of nine cells 200 in a 3×3 square block. The processor 18 analyses each image and identifies the nine cells 200 and the pattern that each cell contains. It also identifies the centre point of each cell 200, and from the centre points of all of the cells 200 it defines the grid 210. Because each cell 200 has two intersecting axes of symmetry passing through its centre it is easy for the processor 18 to identify the centre of each of the cells, and hence to identify the grid 210 on which the cells lie. This enables the processor 18 to check that each of the cells it has identified do indeed lie on the grid, which in turn acts as a check that the cells have been correctly identified. When the nine cells have been identified, the four bits coded in each cell are combined to produce a 36 bit position code, which is then time stamped with the time at which it was recorded and stored in the pen's memory 22. The pen stroke data comprising the sequence of positions recorded can then be used, when transmitted to the PC 400, to reconstruct the strokes made by the pen 8 on the document 2.

Figure 8:
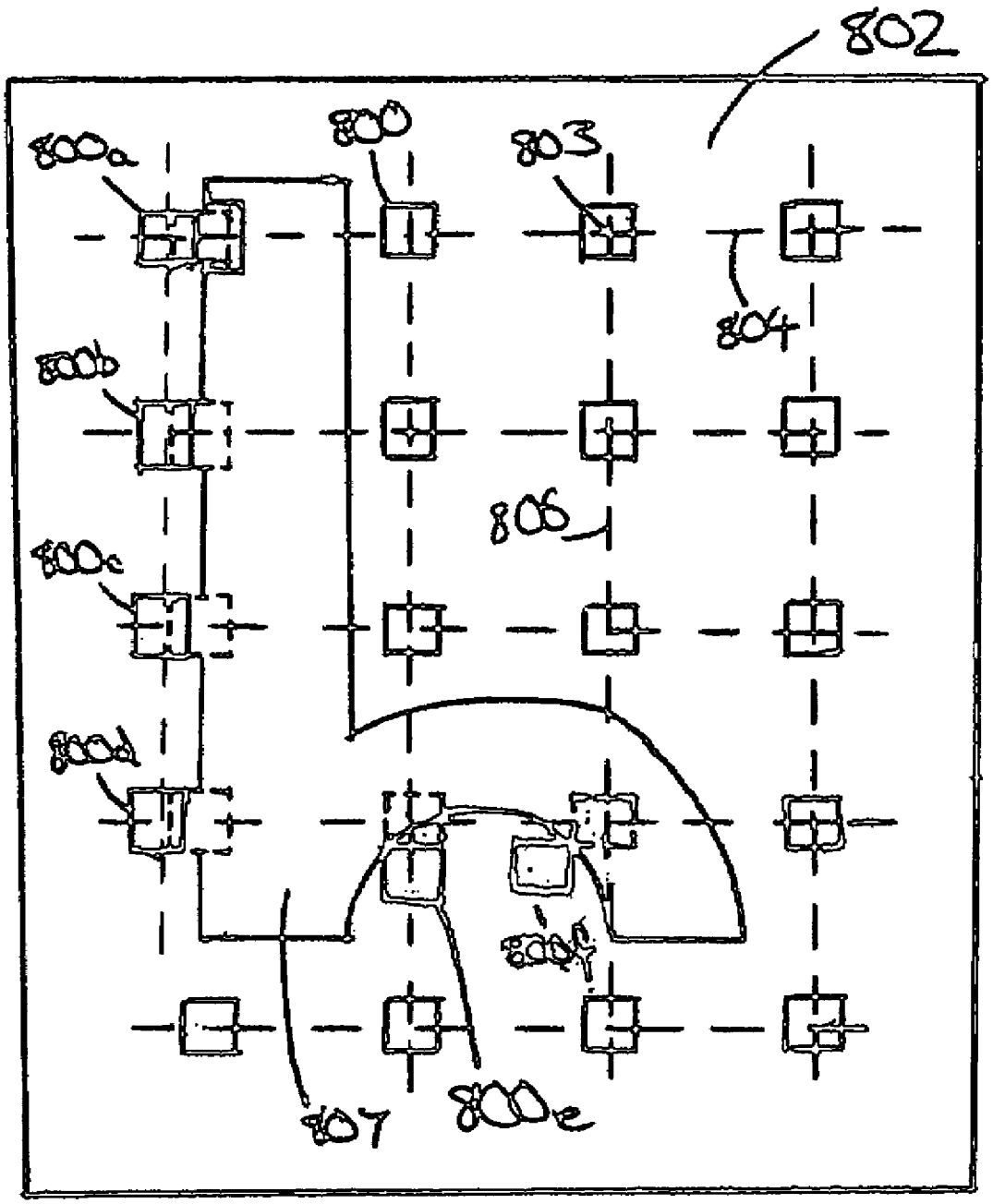
FIG. 8 shows an enlarged portion of a document according to a further embodiment of the invention having data encoding pattern and content on it.

Referring to FIG. 8, in a second embodiment of the invention the position identifying pattern is made up of cells 800 which are the same as those 200 in FIG. 2, and which are arranged on the surface of the document 802. Each of the cells 800 is again associated with a respective intersection 803 of the horizontal and vertical grid lines 804, 806 of a regular square grid. However, in this case the actual position of each of the cells 800 can vary around the intersection 803, to any position in which its centre is still closer to its original intersection than to any of the other intersections. This enables the position of each of the cells 800 to be selected from a range of positions, so as to minimize the amount of overlap of the cells 800 with the content 807.

Figure 9:
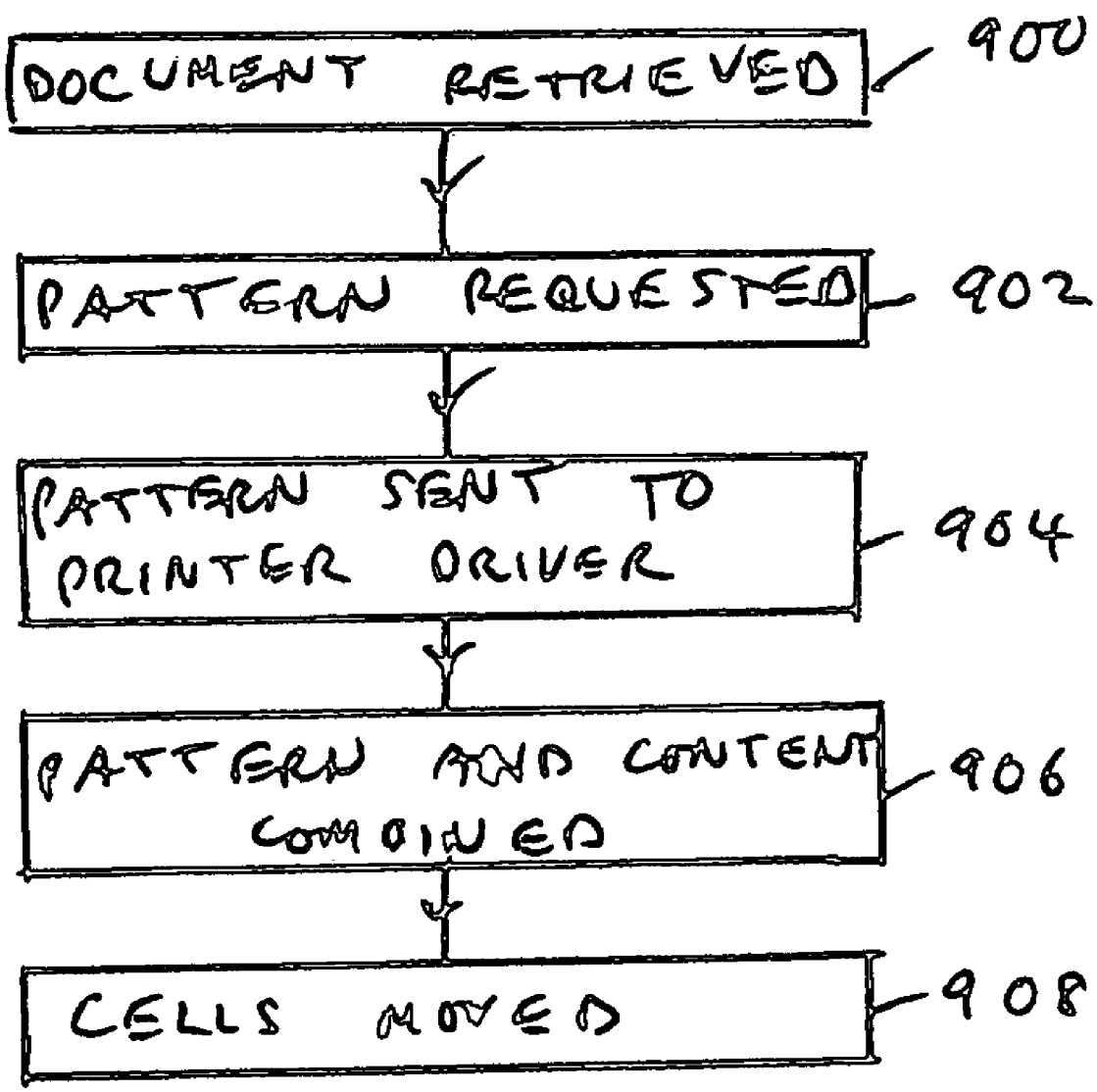
FIG. 9 is a flow diagram illustrating a method according to an embodiment of the invention of producing the document of FIG. 8.

Referring to FIG. 9, in order to produce the document 802, the system of FIGS. 4 and 5 is modified to carry out the following process. At step 900 the electronic document including a definition of the content 807 and the areas of the document that are to have the pattern applied to them is retrieved from memory. At step 902, the necessary amount of pattern is requested from the pattern allocation module 412 by the printer driver 414. The pattern allocation module generates the required amount of pattern and sends it to the printer driver 414 at step 904. At this stage, the pattern is in the form shown in FIG. 3, with each of the cells 800 centred on the respective grid intersection 803. The printer driver 414 then compares the pattern and the content 807 at step 906 to identify which of the cells 800 could be moved within their permitted range of positions to reduce their overlap with the content, and moves them at step 908. In the example of FIG. 8, the four cells 800a, 800b, 800c 800d are all moved to the left from the their nominal positions, which are shown in broken lines, to their final positions which are shown in solid lines. Similarly the cell 800e is moved down from its nominal position and the cell 800f is moved down and to the left. Any cell that does not overlap with the content is left in its original position. Also, any cell 800 that does overlap with the content 807, but cannot be moved within its permitted range of positions so as to reduce the amount of overlap, is left in its original position. The printer driver 414 then combines the pattern and content at step 910 to produce a single image similar to that shown in FIG. 6 but in which the content 807 and the pattern cells 800 overlap to a lesser extent. The printer driver 414 then sends the document for printing at step 912.

When the pen 8 is used to read the pattern made up of the cells 800 it is modified to operate as follows. In any particular image, it firstly identifies any cells 800 in the image, and identifies their centre points. It then analyses the cell positions and the content 807 and determines the original positions of each of the cells 800. This can be done using the reverse of the algorithm that was used to move the cell positions from the original positions when the pattern was printed. Alternatively it can be done by making a number of estimations of the grid position, and for each estimate, determining where the cells 800 would have moved to when combined with the content. The estimate giving the best fit to the cell positions in the image is then used as the original grid position. When the original cell positions have been determined, the pen determines the position of the imaged area of pattern in the same way as the first embodiment described above.

In a modification to this embodiment, the pattern cells 800 are arranged in rows and columns, but the exact position of each cell is again flexible. The positions can be varied provided all of the cells in one row are lower than all of the cells in the row above, and higher than all of the cells in the row below. Similarly all of the cells in one column must be further to the right than all of the cells in the column to the left, and to the left of all the cells in the column to the right. This enables the row and column of each cell to be identified, and therefore the order in which data should be read from the cells.

It will be appreciated that, using the pattern system of FIG. 8, there may be times when the original positions of the cells 800 cannot properly be determined. For example if all nine cells in one image had been shifted in the same direction from their nominal positions on printing, then the pen would have no way of determining that that shift had occurred. This would be acceptable in cases where the pattern is not used to code exact position, but is used to code other data. However, for exact position coding it is clearly a problem.

Referring to FIG. 10 which shows a document 1002 according to a third embodiment of the invention, this problem can be overcome by making some of the cells 1000 reference cells 1000a that have a fixed position, in this case centred on the grid line intersections 1003. The reference cells 1000a are in predetermined positions within the defined pattern, and are identified in the pattern as generated by the pattern allocation module. In this case there is one reference cell 1000a in every four cells 1000, and they are arranged in a regular square grid with a spacing that is double that of the intersections 1003. The combined image of content and pattern is then produced in the same way as described above with reference to FIG. 9, except that the reference cells 1000a are not moved from their original position. All of the other cells 1000 that are not reference cells can be moved so as to reduce overlap with the content. In this case greater freedom is also given in the positions to which the cells 1000 can be moved. Each cell 1000 can move to any position provided it remains nearer to its own original intersection 1003 than any of the other cells 1000 are. In the example shown, the cell 1000b is further away from its original intersection 1003b than it is from the adjacent intersection 1003c. However as no other cell 1000 is closer to its original intersection 1003b than it is, the cell 1000b can be identified by the pen reading the pattern as being associated with the intersection 1003b.

In this case the reference cells 1000a can be identified by the pen because they form a regular square array, and the pen is arranged to identify that array within any single image, and identify the cells 1000*a* that make up the array as reference cells. The pen in this case is arranged to image an area including a 4×4 array of 16 grid intersections. This imaged area will therefore always include at least four of the reference cells 1000*a*. It can then define the location of all of the grid intersection points 1003 within the imaged area, and identify which cell is associated with each grid intersection point. It is then arranged to determine the positional data coded in the group of cells 1000 associated with the identified group of 4×4 intersections 1003, including the reference cells 1000*a* and the non-reference cells. It can then determine the location of the imaged pattern using the position of the grid intersection points within the image, and the positional data which indicates which intersection points 1003 are in the group.

In a modification to this embodiment, the reference cells 1000*a* are not used to encode the positional data, but instead all have the same cell pattern, which might for example be the pattern x from FIG. 2 which includes five black elements in the shape of a cross, thereby clearly defining the centre of the cell. This enables the reference cells to be easily identified by the pen that reads the pattern.

Referring to FIG. 11, in a further embodiment of the invention the reference cells 1100*a* all have the same cell pattern enabling them to be identified. However, they are not arranged in a regular grid. Instead, they are allocated using an algorithm that analyses the content and the cells 1100, and then moves some of the cells 1100 from their original positions centred on the grid intersections 1003 so as to reduce the amount of overlap of cells 1100 and content, whilst ensuring that there is at least one reference cell within any group of nine intersections in a 3×3 square that is not moved from its nominal position on one of the grid intersections 1003. In this embodiment in order to ensure that the pattern can encode sufficient data to define the position of any group of 3×3 cells uniquely, the pattern is arrange such that any seven cells can uniquely identify a position. This means that any square group of nine cells can have up to two reference cells in it and still uniquely code a position.

When the pen 8 is used with the document it is modified to operate as follows. Each image captured by the camera 12 is arranged to be large enough to cover at least one square group of nine intersections 1103. When analysing the image the pen is arranged to identify any reference cells 1100*a* in the imaged area by recognizing the cell pattern that is reserved for reference cells. From the positions of the reference cells, and the size of the reference cells, the pen can identify the grid intersection points on which the pattern is based. For example, from one reference cell it can identify one intersection point as the centre point of the cell, and the vertical and horizontal directions as being parallel to the sides of the cell. In theory it could determine the scale of the grid also from a single cell, since the size of the cells and the size of the grid is known. However, it can clearly determine both the size and orientation of the grid much more accurately from the two or more reference cells that will be in the image. Once the grid has been identified, the position data is determined from all of the non-reference cells, and combined with the defined grid position to determine the absolute position of the image on the document.

In a modification to this embodiment, the requirement for unique position coding of any group of 3×3 cells is dropped. Instead it is assumed that, for any pen stroke made, at least one captured image will uniquely define a position, and for the other image frames in the same stroke, there will be sufficient data to define the position of each image frame relative to the one before it and the one after it.

It will be appreciated that, whereas the examples described above use monochrome printers, it is also possible for the pattern cells to be made up of a number of colours that can be printed on a colour printer. This requires a more sophisticated colour imaging system in the pen, but can encode more data within a given cell size.

The invention claimed is:

1. A product having a data encoding pattern thereon, the pattern comprising a plurality of pattern cells each of which has a pattern selected from a group of cell patterns, wherein each cell pattern comprises a plurality of cell elements each of which can have any of a plurality of marking states, such that the marking states of the elements produce the cell pattern, each cell pattern having at least two lines of symmetry, the product having content thereon in addition to the pattern, wherein at least some of the cells are arranged in a manner which is dependent on the position of the content.

2. A product according to claim 1 wherein the plurality of pattern cells include a number of reference cells which are in the predetermined positions and a number of other cells arranged in a manner which is dependent on the position of the content.

3. A product according to claim 2 wherein the reference cells have different cell patterns from the other cells so that they can be identified as reference cells.

4. A method of generating a data encoding pattern and a content for application to a product, the method comprising the steps of:
    defining a plurality of pattern cells on the product each of which has a pattern selected from a group of cell patterns, wherein each cell pattern comprises a plurality of cell elements each of which can have any of a plurality of marking states, such that the marking states of the elements produce the cell pattern, each cell pattern having at least two lines of symmetry; and
    defining a position on the product for each of the cells, wherein the step of defining a position on the product for each of the cells comprises identifying a position on the product for the content and defining a position on the product for each of at least some of the cells which is dependent on the position on the product for the content.

5. A method according to claim 4 wherein some of the cells are defined as reference cells for which the positions are defined in a predetermined manner.

6. A method according to claim 5 wherein the predetermined manner is independent of the content.

7. A method according to claim 5 wherein the predetermined manner is dependent on the content.

8. A method according to claim 5 wherein each of the reference cells has a pattern defined for it that identifies it as a reference cell.

9. A method according to claim 5 wherein the positions of the reference cells are defined such that, within any area of pattern of a predetermined size, there will be at least one reference cell.

10. A method of generating an image comprising a content component and a data encoding component, wherein the data encoding component comprises a plurality of cells each of which has one of a group of cell patterns, the method comprising:
    determining the cell patterns of a plurality of cells; and
    locating the cells at positions dependent on a position of the content component.

11. A method according to claim 10 comprising:
    identifying some of the cells as reference cells and locating them in predetermined positions; and identifying some of the cells as non-reference cells and locating them at positions dependent on the content component.

12. A method according to claim 11 wherein the positions of the non-reference cells are selected so as to control the level of overlap between the pattern and content components.

13. A method according to claim 12 including identifying nominal positions and a range of allowable final positions for the non-reference cells, and selecting a final position from the allowable positions.

14. A method according to claim 13 wherein the final positions of the cells are selected so as to minimize the overlap between the content and the pattern.

15. A system for generating an image comprising a content component and a data encoding component, wherein the data encoding component comprises a plurality of cells each of which has one of a group of cell patterns, the system being arranged to:
   determine the cell patterns of a plurality of the cells; and
   locate at least some of the cells at positions dependent on a position of the content component.

16. A system according to claim 15, wherein the system is further arranged to:
   identify some other cells of the plurality of cells as reference cells and locating them in predetermined positions; and
   identify the at least some of the plurality cells as non-reference cells and locating them at positions dependent on the content component.

17. A method of reading data from a pattern on a product having, data encoding pattern and content thereon, the method comprising:
   imaging an area of the product;
   identifying within the imaged area a plurality of pattern cells;
   determining a position of each of the cells in the imaged area, the position of at least some of the cells being dependent on a position of the content on the product;
   identifying a pattern of each of the cells; and
   deriving the data from the pattern and the positions of the cells.

18. A method according to claim 17 comprising:
   identifying one of the cells as a reference cell indicating a reference position;
   identifying a plurality of other cells as a non-reference cells that may each be in any of a range of positions and that each encode data; and
   determining from the relative positions of the non-reference cells an order in which the data is to be read from them.

19. A method according to claim 18 further comprising reading the data from the non-reference cells and combining it in said order.

20. A method according to claim 19 wherein the data is combined to produce a positional data string identifying a position on the product.

* * * * *